(12) United States Patent
Yamada

(10) Patent No.: US 8,013,891 B2
(45) Date of Patent: Sep. 6, 2011

(54) ILLUMINANCE ACQUIRING DEVICE, ILLUMINANCE ACQUIRING METHOD, AND ILLUMINANCE ACQUIRING PROGRAM

(75) Inventor: Yoshihito Yamada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1241 days.

(21) Appl. No.: 11/674,382

(22) Filed: Feb. 13, 2007

(65) Prior Publication Data

US 2007/0195201 A1    Aug. 23, 2007

(30) Foreign Application Priority Data

Feb. 20, 2006   (JP) ................... 2006-042023

(51) Int. Cl.
*H04N 17/00* (2006.01)
*H04N 17/02* (2006.01)
(52) U.S. Cl. ...................................................... 348/187
(58) Field of Classification Search .......... 348/187–188, 348/208.99, 219.1, 222.1–230.1
See application file for complete search history.

(56) References Cited

U.S. PATENT DOCUMENTS

| | | | | |
|---|---|---|---|---|
| 7,038,712 | B1 * | 5/2006 | Livingston et al. | 348/187 |
| 7,847,821 | B2 * | 12/2010 | Nussbacher | 348/187 |
| 2007/0242320 | A1 | 10/2007 | Horie | |

FOREIGN PATENT DOCUMENTS

| JP | A 07-131708 | 5/1995 |
|---|---|---|
| JP | A-2005-303803 | 10/2005 |

* cited by examiner

*Primary Examiner* — Michael Lee
(74) *Attorney, Agent, or Firm* — Oliff & Berridge, PLC

(57) ABSTRACT

An illuminance acquiring device calculates the intensity of light sensed by the image pickup device acquired every different exposure time, and acquires the calculated intensity of light. The illuminance acquiring device including a noise-model data calculating section calculating noise-model data for modeling an influence of a noise generated in the image pickup device by using image pickup data obtained by means of the image pickup at different exposure time; and an illuminance calculating section calculating the output value of the image pickup device in consideration of the influence of the noise from the noise-model data and the output value of the image pickup device, acquiring the light energy by using the calculated output value, and calculating the intensity of the sensed light.

9 Claims, 9 Drawing Sheets

ILLUMINANCE ACQUIRING DEVICE, ILLUMINANCE ACQUIRING METHOD, AND ILLUMINANCE ACQUIRING PROGRAM

BACKGROUND

1. Technical Field

The present invention relates to an illuminance acquiring device, an illuminance acquiring method, and an illuminance acquiring program which acquire an intensity of light sensed by an image pickup device for converting the intensity of light into electric energy.

2. Related Art

A high-quality image display can be realized by exactly performing an image evaluation process and performing an image adjustment process in which the evaluation result is reflected. It is important to acquire brightness and color tone of a display screen of a display device with high accuracy and precision and various technologies therefor are suggested.

A device acquiring the brightness or color tone of the display screen of the display device acquires an image which the display device displays under an experimentally determined measurement condition by using various types of sensors such as an accurately corrected brightness meter, a color meter, and a charge coupled device (CCD) camera and acquires the brightness and color tone of the display screen of the display device by property processing output data.

However, the acquiring device using such a method cannot acquire the output data in which the recognizable brightness or color tone is reflected with high precision due to an influence such as a resolution of an intensity of light by a sensor or a noise generated in the sensor. Additionally, it is considered that a repeatability of the output data is not enough as well.

In order to perform a higher precision measurement, there is a device which acquires the display screen by cooling a temperature of the sensor lower than the normal temperature and by suppressing a sensor noise. However, there are various problems that a large-scale device is necessary, a price of the device is high, and an operational environment or condition of the device is limited, etc.

A method that the light energy is acquired by using a relation table that represents a correspondence relation between an output value of a CCD sensor and a product intensity of light×exposure time=light energy) of the intensity of light sensed by the CCD sensor and an exposure time by using the image pickup data which the CCD camera obtains by picking up the display screen of the display device while changing the exposure time; and the intensity of light (also called a radiant illuminance) sensed by the CCD sensor from the acquired light energy and the exposure time is conceivable. The relation table representing the correspondence relation between the output value of the CCD sensor and the product (light intensity×exposure time=light energy) of the intensity of light sensed by the CCD sensor and the exposure time is called the relation table between the output value of CCD sensor and light energy.

However, since the light energy is acquired by using the output value of the CCD sensor n which an influence of a noise generated in the CCD sensor is not considered and the radiant illuminance is calculated from the acquired light energy, the influence of the noise is involved in the calculated radiant illuminance. Accordingly, the described method has a problem that the calculated radiant illuminance is changed by a method of setting the exposure time.

For example, a technology synthesizing a plurality of image data in which an exposure condition is different and generating the image data with the high dynamic range is disclosed in JP-A-7-131708. When a plurality of image data in which the exposure condition varies are synthesized and the image data with the high dynamic range are generated, the technology disclosed in JP-A-7-131708 recalculates a conversion equation (magnification ratio) for converting the image data into the image data with the high dynamic range whenever synthesizing the image data.

That is, the technology disclosed in JP-A-7-131708 synthesizes the image data with the high dynamic range without an exposure-excess area or an exposure-shortage area by calculating each pixel value of the image data with the high dynamic range from the exposure time and the pixel value of the image data. In this case, the conversion equation (magnification ratio) for converting the image data into the image data with the high dynamic range is recalculated whenever synthesizing the image data.

However, since the noise generated in the image pickup device such as the CCD sensor is not considered in the technology disclosed in JP-A-7-131708, there is a problem that a value of the image data with the high dynamic range is considerably changed by the method of setting the exposure time.

A gist of the technology disclosed in JP-A-7-131708 is not to acquire the brightness or color tone of the display screen for performing the image evaluation process of the display device, but mainly to expand the dynamic range of a digital camera and the like using the image pickup device such as the CCD sensor. Accordingly, it is understood that it is not nearly necessary to consider the noise generated in the image pickup device such as the CCD sensor. However, in order to accurately perform the image evaluation process of the display device, when the gist is to acquire the brightness, the color tone and the like of the display screen, it is important that the noise generated in the image pickup device such as the CCD sensor is considered.

SUMMARY

An advantage of some aspects of the invention is that it provides an illuminance acquiring device, an illuminance acquiring method, and an illuminance acquiring program, which can acquire an intensity of light sensed by the image pickup device with high precision in consideration of an influence of a noise generated in an image pickup device.

According to an aspect of the invention, there is provided an illuminance acquiring device which acquires light energy corresponding to an output value of an image pickup device every different exposure time by using a correspondence relation between the output value of the image pickup device for converting intensity of sensed light into electric energy and outputting the electric energy and the light energy obtained by multiplying the intensity of light sensed by the image pickup device with the exposure time, calculates the intensity of light sensed by the image pickup device from the light energy acquired every different exposure time and the correspondence relation, and acquires the calculated intensity of light sensed by the image pickup device, the illuminance acquiring device including a noise-model data calculating section calculating noise-model data for modeling an influence of a noise generated in the image pickup device on the output value of the image pickup device by using image pickup data obtained by means of the image pickup operation of the image pickup device every different exposure time; and an illuminance calculating section calculating the output value of the image pickup device in consideration of the influence of the noise from the noise-model data and the output value of the image pickup device when the image pickup device picks up a predetermined image, acquiring the light energy from the correspondence relation by using the calculated output value of the image pickup device in consideration of the influence of the noise, and calculating the intensity of the sensed light when the image pickup device picks up the predetermined image from the acquired light energy and the exposure time when the image pickup device picks up the predetermined image.

In the illuminance acquiring device, the noise-model data for modeling the influence of the noise generated in the image pickup device are calculated, the output value of the image pickup device in consideration of the influence of the noise is calculated from the calculated noise-model data and the output value of the image pickup device when the image pickup device picks up a predetermined image, the light energy is acquired from the correspondence relation by using the output value of the image pickup device in consideration of the calculated noise influence, the intensity of light (also called a radiant illuminance) sensed when the image pickup device picks up the predetermined image is calculated from the acquired light energy and the exposure time when the image pickup device picks up the predetermined image. The influence of the noise generated in the image pickup device is removed, thereby realizing the radiant illuminance with the higher precision than that obtained in the related art method. Accordingly, by using the radiant illuminance acquired by the illuminance acquiring device of the aspect of the invention when performing the image evaluation process of the display device, the image evaluation process of the display device may be accurately performed.

A pixel-location data output section may select a plurality of pixels from the image pickup data to set the selected pixels as selection pixels and outputs pixel locations of the set selection pixels as pixel-location data.

The pixel-location data output section sets the plurality of pixels as the selection pixels in the pickup image data and outputs the pixel-location data of the set selection pixels, and the output values of the image pickup device required to make the noise-model data may be properly obtained from the pixel-location data outputted from the pixel-location data output section.

A plurality of pixels may be set as selection candidate pixels from the image pickup data and the selection pixels are set by selecting the pixels outputting a value in which the output value of the image pickup device varies every exposure time of the different exposure times.

When the selection pixels are set, first, a plurality of pixels are set as the selection candidate pixels from the image pickup data, and the pixels outputting values in which the output value of the image pickup device varies every exposure time of the different exposure times are selected from the plurality of selection candidate pixels. In this manner, by setting the pixels of which the output values are changed in accordance with a change in the exposure time as the selection pixels, the output values of the image pickup device in the selection pixels may be used to generate the noise-model data in which changes in an image pickup condition and the like are properly reflected, for example, when the noise-model data and the like are generated.

The output value of the image pickup device in the pixel designated by the pixel-location data may be used as the output value of the image pickup device used to calculate the noise-model data.

By using the output value of the image pickup device in the pixel designated by the pixel-location data as the output value of the image pickup device used to calculate the noise-model data, the output values of the image pickup device required at the time of making the noise-model data may be properly obtained.

The noise-model data calculating section and the illuminance calculating section may perform a weighting process of reducing an influence of an exposure-excess area and an exposure-shortage area on the output value of the image pickup device when calculating the noise-model data and the intensity of the light sensed by the image pickup device.

By performing the weighting process of reducing the influence of an area such as the exposure-excess area, the exposure-shortage area on the output value of the image pickup device, and the like in which the output values of the image pickup device are not stable, the high-reliable noise-model data and radiant illuminance may be calculated.

The noise-model data may have the exposure time as a parameter.

That is because the influence of the noise with the exposure time varies and by having the exposure time of the noise-model data as the parameter, the noise-model data in which the exposure time is properly reflected may be set.

The image pickup device may be a CCD sensor.

By using the CCD sensor as the image pickup device, a digital camera using the CCD sensor and the like may be used to calculate three radiant illuminance.

According to another aspect of the invention, there is provided an illuminance acquiring method of acquiring light energy corresponding to an output value of an image pickup device every different exposure time by using a correspondence relation between the output value of the image pickup device for converting intensity of sensed light into electric energy and outputting the electric energy and the light energy obtained by multiplying the intensity of light sensed by the image pickup device with the exposure time, calculates the intensity of light sensed by the image pickup device from the light energy acquired every different exposure time and the correspondence relation, and acquiring the calculated intensity of light sensed by the image pickup device, the illuminance acquiring method including: calculating noise-model data for modeling an influence of a noise generated in the image pickup device on the output value of the image pickup device by using image pickup data obtained by means of the image pickup of the image pickup device at different exposure time; and calculating the output value of the image pickup device in consideration of the influence of the noise from the noise-model data and the output value of the image pickup device when the image pickup device picks up a predetermined image, acquiring the light energy from the correspondence relation by using the calculated output value of the image pickup device in consideration of the influence of the noise, and calculating the intensity of the sensed light when the image pickup device picks up the predetermined image from the acquired light energy and the exposure time when the image pickup devices picks up the predetermined image.

The illuminance acquiring method can have the same advantages as the above-mentioned illuminance acquiring device. The illuminance acquiring method also has the same features as the above-mentioned illuminance acquiring device.

According to another aspect of the invention, there is provided an illuminance acquiring program of acquiring light energy corresponding to an output value of an image pickup device at every different exposure time by using a correspondence relation between the output value of the image pickup device for converting intensity of sensed light into electric energy and outputting the electric energy and the light energy obtained by multiplying the intensity of light sensed by the image pickup device with the exposure time, calculating the intensity of light sensed by the image pickup device from the light energy acquired every different exposure time and the correspondence relation, and acquiring the calculated intensity of light sensed by the image pickup device, the illuminance acquiring program including: calculating noise-model data for modeling an influence of a noise generated in the image pickup device on the output value of the image pickup device by using image pickup data obtained by means of the image pickup of the image pickup device at different exposure time; and calculating the output value of the image pickup device in consideration of the influence of the noise from the noise-model data and the output value of the image pickup device when the image pickup device picks up a predetermined image, acquiring the light energy from the correspondence relation by using the calculated output value of the image pickup device in consideration of the influence of the noise, and calculating the intensity of the light sensed when the image pickup device picks up the predetermined image from the acquired light energy and the exposure time when the image pickup device picks up the predetermined image.

By executing the illuminance acquiring program of the aspect of the invention, the intensity of light sensed by the image pickup device may be obtained with a high precision similarly to the illuminance acquiring device of the first aspect, thereby obtaining the same effect as the illuminance acquiring device of the first aspect. Additionally, the illuminance acquiring program has the same features as the above-mentioned illuminance acquiring device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figures 1A, 1B, 1C:
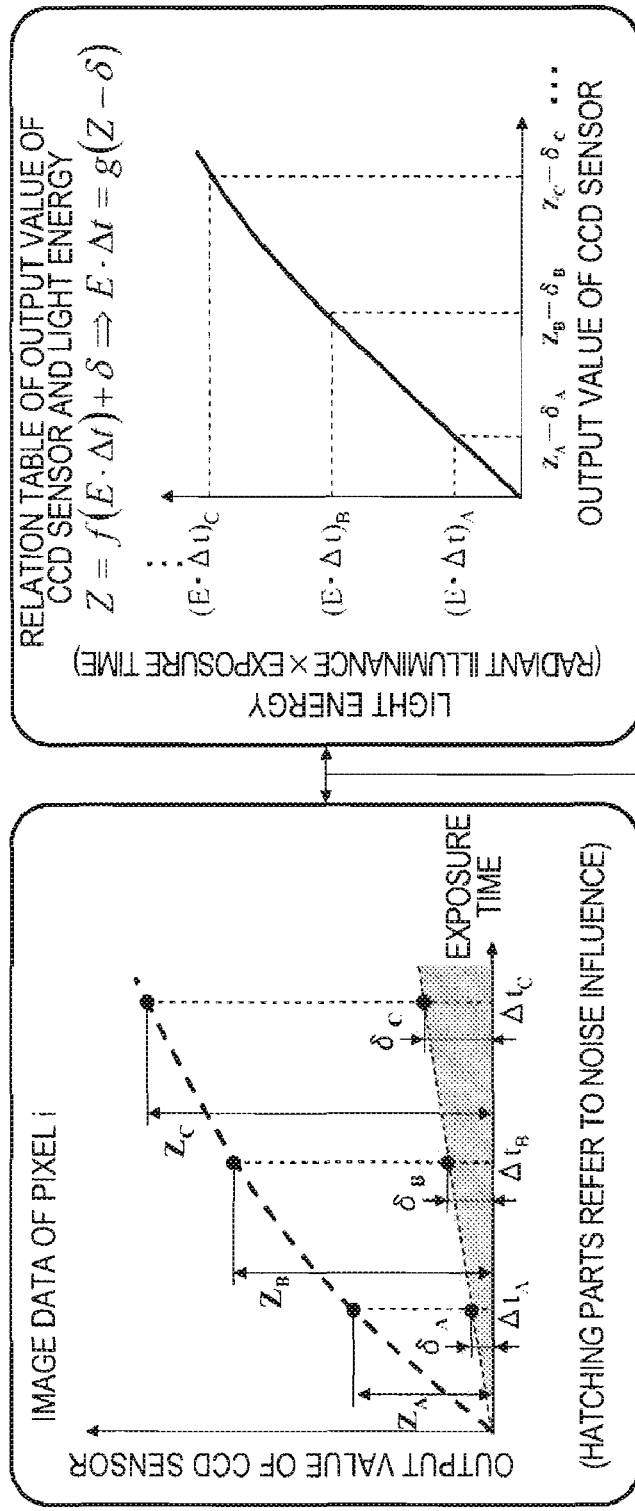
FIGS. 1A to 1C are diagrams explaining a process in which an output value of a CCD sensor in consideration of an influence of a noise is used to calculate a radiant illuminance.

Hereinafter, an embodiment of the invention will be described. As an image pickup device for converting an intensity of the sensed light into electric energy and outputting the result, a charged coupled device (CCD) sensor will be used in the embodiment. In the first place, a brief overview of the invention will be described.

In the invention, a relation table representing a corresponding relation between the output values (which is also called output values of CCD sensor) from the CCD sensor and light energies acquired by a product of an intensity of light sensed by the CCD sensor and an exposure time is used to acquire light energies corresponding to the output values of the CCD sensor every different exposure time; the image pickup data acquired by picking up the image in the CCD sensor every different exposure time are used to calculate noise-model data in which an influence of a noise with respect to the output value of the CCD sensor (increment of the output values of the CCD sensor due to a noise) generated in the CCD sensor is modeled when the light energies acquired every different exposure time and the intensity of light sensed from the corresponding relation by the CCD sensor; the output values of the CCD sensor are calculated in consideration of the influence of the noise from the calculated noise model data and the output values of the CCD sensor; the output values of the CCD sensor in consideration of the influence of the noise are used to acquire the light energies from the relation table of the output values of the CCD sensor and the light energies; and the intensity of light sensed when the image pickup device picks up a predetermined image is calculated from the acquired light energies and the exposure time when the image pickup device picks up the predetermined image.

The invention has an advantage as follows: when the light energies are acquired from the output values of the CCD sensor acquired every different exposure time, the light energies are acquired from the output values of the CCD sensor in consideration of the influence of the noise in the relation table of the output values of the CCD sensor and the light energies, and then a radiant illuminance is calculated from the acquired light energies.

When the light energies are acquired from the relation table of the output values of the CCD sensor and light energies and then the radiant illuminance is calculated from the acquired light energies by using the output values of the CCD sensor without consideration of the influence of the noise generated by the CCD sensor, the calculated radiant illuminance is involved in the influence of the noise. An exact image evaluation process cannot be performed when evaluating the image of the display device by using the radiant illuminance in which the influence of the noise is contained.

In the invention, noise-model data in which an influence of a noise (increment of the output values of the CCD sensor due to the noise) involved in the output values of a CCD sensor is modeled is calculated on the basis of the image pickup data corresponding to each exposure time and acquired by picking up any same display image represented in a display device every different exposure time.

The output values of the CCD sensor in which the influence of the noise (increment of the output values of the CCD sensor due to the noise) is removed from the output values of the CCD sensor, that is, the output values of the CCD sensor in consideration of the influence of the noise are acquired from the calculated noise-model data to acquire the light energies from the output values of the CCD sensor in consideration of the influence of the noise and to calculate a radiant illuminance from the acquired light energies. In this manner, the radiant illuminance with a high precision in consideration of the influence of the noise can to obtained.

FIGS. 1A to 1C are diagrams explaining a process in which the output values of the CCD sensor in consideration of the influence of the noise is used to calculate the radiant illuminance.

FIG. 1A is the diagram representing the output values of the CCD sensor with respect to a change in an exposure time $\Delta t$ of the image pickup data of a pixel i. FIG. 1A shows the output values of the CCD sensor when the exposure time $\Delta t$ is changed into $\Delta t_A$, $\Delta t_B$, and $\Delta t_C$ ($\Delta t_A < \Delta t_B < \Delta t_C$). Additionally, hatching parts of FIG. 1A represent the influence of the noise (increment of the output values of the CCD sensor due to the noise) generated in the CCD sensor. As shown in FIG. 1A, as the exposure time increases more, the values of the influence of the noise becomes larger.

In FIG. 1A, the output values of the CCD sensor at the exposure time $\Delta t_A$, $\Delta t_B$, and $\Delta t_C$ are $Z_A$, $Z_B$, and $Z_C$, respectively, and $Z_A$, $Z_B$, and $Z_C$ contain the influence of the noise (increment of the output values of the CCD sensor due to a noise) $\delta_A$, $\delta_B$, and $\delta_C$ at the exposure time $\Delta t_A$, $\Delta t_B$, and $\Delta t_C$, respectively.

In the invention, as the output values of the CCD sensor minus the influence of the noise (increment of the output values of the CCD sensor due to the noise) generated in the CCD sensor, that is, the output values of the CCD sensor $(Z-\delta)$ in consideration of the influence of the noise, a product of the radiant illuminance E and the exposure time $\Delta t$ (=light energy $E \cdot \Delta t$) is obtained and the radiant illuminance E is obtained from the acquired light energy $E \cdot \Delta t$.

The output value Z of the CCD sensor without consideration of the influence of the noise is expressed as follows:

$$Z = f(E \cdot \Delta t) \quad (1).$$

A relational expression of the output values of the CCD sensor and the light energies from Expression 1 is expressed as follows:

$$E \cdot \Delta t = g(Z) \quad (2).$$

The output values of the COD sensor in consideration of the influence of the noise are expressed as follows:

$$Z = f(E \cdot \Delta t) + \delta \quad (3),$$

and a relational expression of the output values of the CCD sensor in consideration of the influence of the noise and the light energies is expressed as follows:

$$E \cdot \Delta t = g(Z - \delta) \quad (4).$$

In Expression (1) to (4), Z, E, $\Delta t$, and $\delta$ are the output value of the CCD sensor, the radiant illuminance, the exposure time, and the influence of the noise (increment of the output values of the CCD sensor due to a noise), respectively. Additionally, $E \cdot \Delta t$ is the light energies and g is $f^{-1}$.

In the invention, in the described Expression 4, that is, the relational expression of the output values of the CCD sensor in consideration of the influence of the noise and the light energies, the light energies $E \cdot \Delta t$ are obtained from the output values of the CCD sensor in consideration of the influence of the noise, and then the radiant illuminance E is calculated from the obtained light energy. In this manner, the calculated radiant illuminance E is a value in which the influence of the noise is removed.

When the radiant illuminance $E_i$ in any pixel i (where i refers to an index of the pixel) on the pixel matrix of the image pickup data is expressed as an equation having a weighted average in consideration of a weight with respect of the output values of the CCD sensor as follows (see FIG. 1C):

$$E_i = \frac{\sum_{j=1}^{N} W(Z_{i,j}) g(Z_{i,j} - \delta_j) / \Delta t_j}{\sum_{j=1}^{N} W(Z_{i,j})} \quad (5)$$

where $W(Z_{i,j})$, which is described below, j, and N are a weighting factor, an index of the exposure time, and a total number of the index of the exposure time, respectively.

Figure 2:
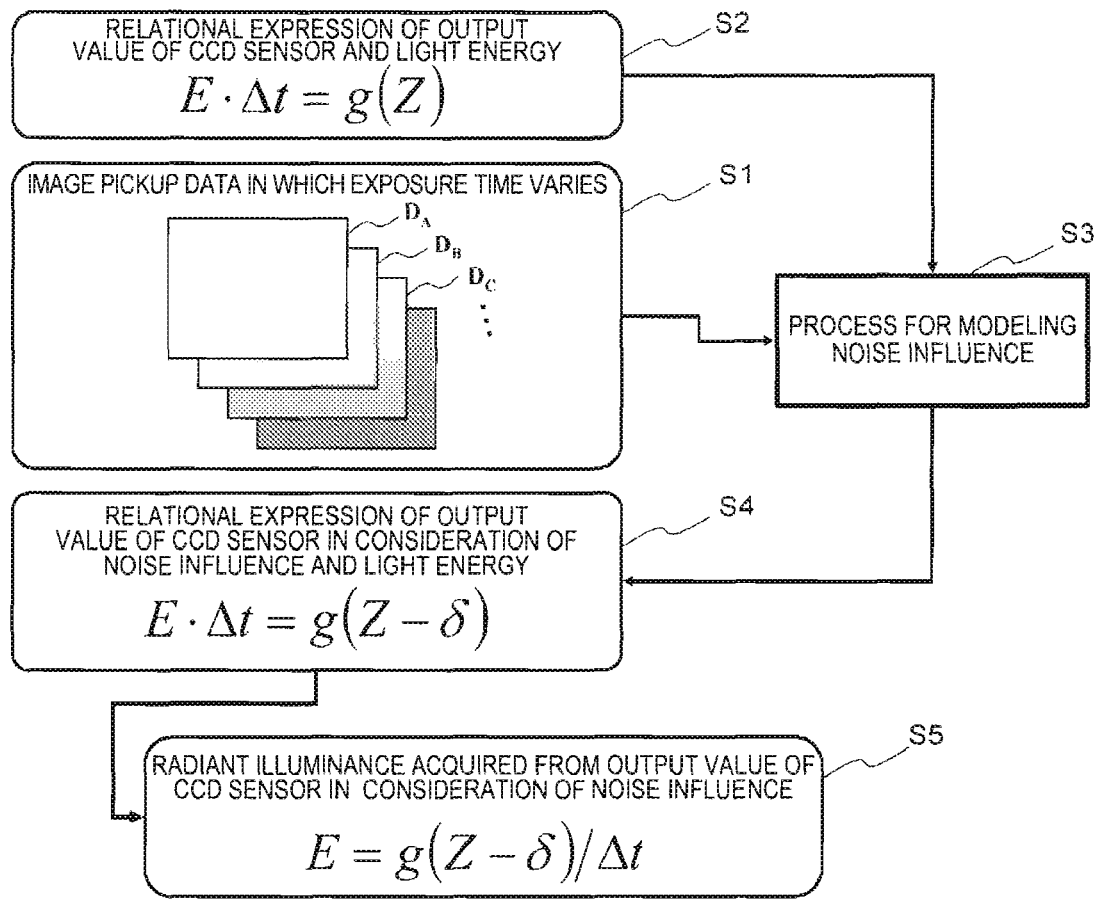
FIG. 2 is a diagram roughly explaining a sequence in which the radiant illuminance is calculated from the relational expression of the output values of the CCD sensor in consideration of the influence of the noise and light energy.

FIG. 2 is a diagram roughly explaining a sequence in which the radiant illuminance is calculated from the relational expression of the output values of the CCD sensor in consideration of the influence of the noise and the light energies. As shoal in FIG. 2, first, the image pickup data $D_A$, $D_B$, $D_C$, ... and the relational expression of the output values of the CCD sensor and the light energies, that is, describe Expression 2 are obtained (steps S1 and S2) and then a process of modeling the influence of the noise (increment of the output values of the CCD sensor due to the noise, is performed (step S3).

The relational expression of the output values of the CCD sensor in consideration of the influence of the noise and the light energies, that is, described Expression 4 is evaluated (step S4), and then the radiant illuminance E is evaluated from Expression 4 (step S5), The radiant illuminance E is expressed as follows:

$$E = g(z - \delta) \Delta t \quad (6).$$

The radiant illuminance E calculated from Expression 6 is the radiant illuminance in which the output values of the CCD sensor in consideration of the influence of the noise is reflected, that is, the radiant illuminance where the influence of the noise is removed.

In order to calculate described Expression 4 more easily, Expression (4) is modified as follows:

$$E \cdot \Delta t = g(Z - \delta), \quad (4)$$

$$\begin{cases} E \cdot \Delta t = g(Z) - \delta \frac{\partial g}{\partial Z} + \frac{\delta^2}{2} \frac{\partial^2 g}{\partial Z^2} - \frac{\delta^3}{6} \frac{\partial^3 g}{\partial Z^3} + \dots \\ \Leftarrow g(Z - \delta) = \sum_{n=0}^{N} \frac{(-\delta)^n}{n!} \frac{\partial^n}{\partial Z^n} g(Z) \end{cases} \quad \text{and,} \quad (7)$$

$$E \cdot \Delta t \approx g(Z) - \delta \frac{\partial g}{\partial Z}. \quad (8)$$

Expression 7 is the Tayler's expansion of the right term $g(z-\delta)$ of Expression 4 in $-\delta$, and Expression 8 stops the Tayler's expansion and approximates the influence of the noise such that the right term of Expression 7 is a linear expression of the influence of the noise (increment of the output values of the CCD sensor due to the noise) $\delta$.

In the invention, a process of modeling noise is performed on the basis of Expression 8. In this case, since the term (approximated term) expressing the influence of the noise (increment of the output values of the CCD sensor due to the noise) in the right term of Expression 8 is expressed as a function of $\delta$ and the exposure time $\Delta t$, that is, as an equation $\delta = h(\Delta t)$, the right term is expressed as:

$$\delta \frac{\partial g}{\partial Z} = h(\Delta t) \frac{\partial g}{\partial Z}. \tag{9}$$

In the invention, the radiant illuminance with a high precision without the influence of the noise generated in the CCD sensor can be evaluated by using Expression 8.

Figure 3:
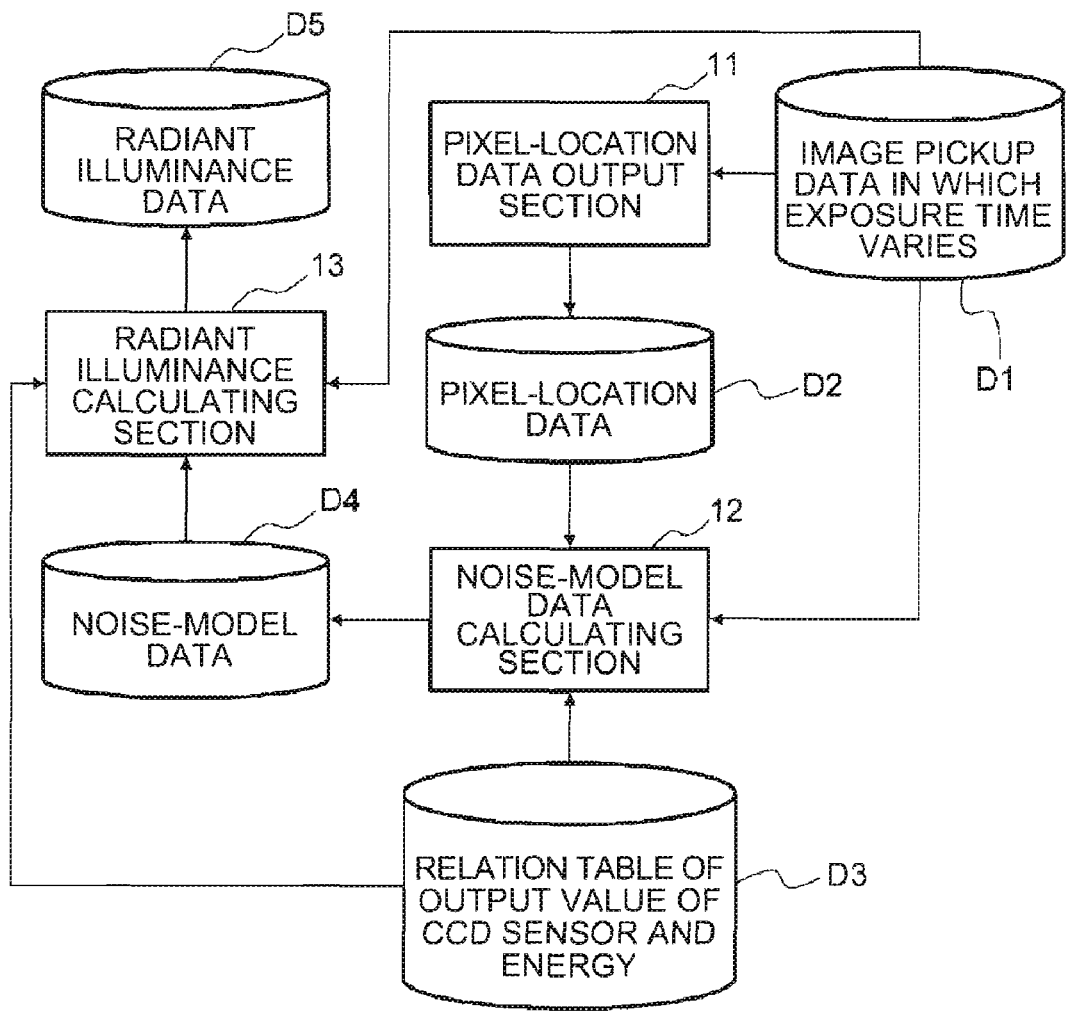
FIG. 3 is a diagram illustrating a configuration of an illuminance acquiring device according to an embodiment of the invention.

Next, an embodiment of the invention will be described. FIG. 3 is a diagram illustrating a configuration of an illuminance acquiring device related to the embodiment of the invention. As shown in FIG. 3, the illuminance acquiring device related to the embodiment has a pixel-location data output section 11 outputting a plurality of pixel-location data, which is used at the time of calculating the noise-model data, as pixel location data; a noise-model data calculating section 12 calculating noise-model data; and an illuminance calculating section 13 (where it is a radiant illuminance calculating section 13 in FIG. 3) calculating an intensity of light sensed by the CCD sensor, that is, an radiant illuminance.

Data required for various processes performed by the illuminance acquiring device and data calculated by each configuration element are an image pickup data D1 having image pickup data $D_A, D_B, D_C, \ldots$ which are obtained by picking up the same display image displayed on a display device at difference exposure time, that is, by changing the exposure time and picking up the same display image and correspond to each exposure time; a pixel-location data D2 outputted from the pixel-location data output section 11; a relation table D3 between the output values of the CCD sensor and the light energies which express the relational expression of the output values of the CCD sensor expressed as the described in Expression 2; a noise-model data D4 calculated by the noise-model data calculating section 12; and a radiant illuminance data D5 calculated by a radiant illuminance calculating section 13.

The image pickup data $D_A, D_B, D_C, \ldots$ corresponding to each exposure time are acquired by picking up the same display image at several different exposure time by a digital camera which uses the CCD sensor as the image pickup device, and the CCD sensor output of each pixel becomes each of the output values of the CCD sensor. Additionally, each different exposure time can be set by changing a shutter speed.

The pixel-location data output section 11 selects a pixel of which pixel location on the pixel matrix of the image pickup data is used as the output value of the CCD sensor used when the noise-model data calculating section 12 calculates the noise-model data D4. The pixel-location data output section 11 has a function to output the selected pixel-location data, and thus outputs the selected pixel-location data as the pixel-location data D2.

The relation table D3 of the output values of the CCD sensor and the light energies is a table showing the relational expression of the output values of the CCD sensor and the light energies (radiant illuminance×exposure time).

The noise-model data calculating section 12 has a function to calculate the noise-model data D4 modeling the influence of the noise (increment of the output values of the CCD sensor due to a noise) of the output values of the CCD sensor on the basis of the pixel-location data D2, the image pickup data $D_A, D_B, D_C, \ldots$, corresponding to each exposure time, and the relation table D3 of the output values of the CCD sensor and the light energies.

The radiant illuminance calculating section 13 has a function to make a relational expression of the output values of the CCD sensor and the light energies containing the noise-model data on the basis of the noise-model data D4, the image pickup data $D_A, D_B, D_C, \ldots$, corresponding to each exposure time, and the relation table D3 of the output values of the CCD sensor and the light energies, to acquire the light energies by using the relational expression of the output values of the CCD sensor and the light energies containing the noise-model data, and to calculate the radiant illuminance from the acquired light energies and acquire the radiant illuminance as the radiant illuminance data D5.

Figure 4:
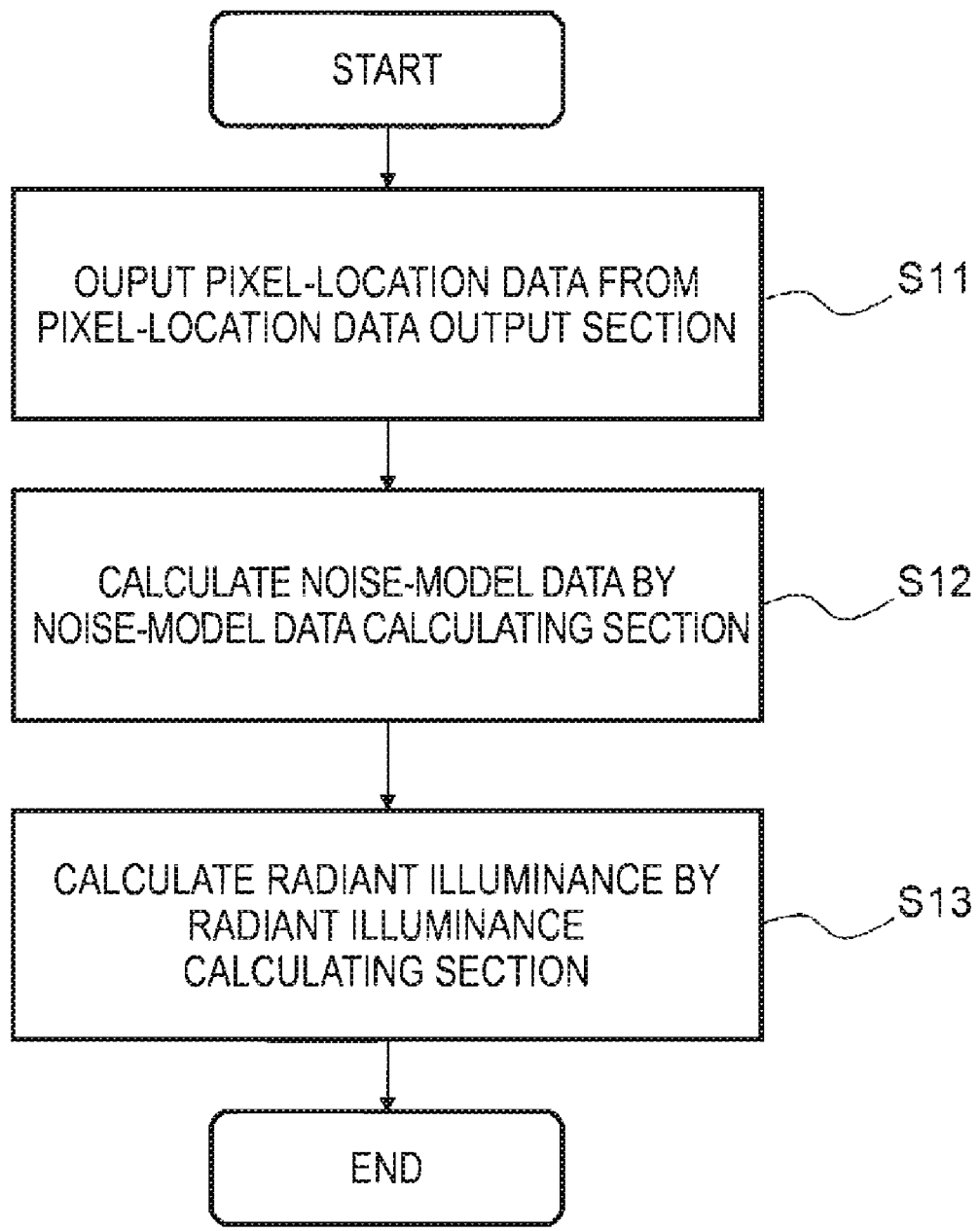
FIG. 4 is a flowchart roughly explaining an overall processing sequence of an illuminance acquiring device according to the embodiment of the invention.

FIG. 4 is a flowchart roughly explaining an overall processing sequence of the illuminance acquiring device according to the embodiment. As shown in FIG. 4, a pixel used at the time of calculating the noise-model data is selected to output the pixel-location data D2 representing the selected pixel location from the pixel-location data output section 11 (step S11) Next, the noise-model data D4 in which the influence of the noise (increment of the output values of the CCD sensor due to a noise) of the output values of the CCD sensor is modeled is calculated on the basis of the pixel-location data D2, the image pickup data $D_A, D_B, D_C, \ldots$ corresponding to each exposure time, and the relation table D3 of the output values of the CCD sensor and the light energies by the noise-model data calculating section 12 (step S12).

The radiant illuminance is calculated by the radiant illuminance calculating section 13 (step S13). In step S13 the light energies are acquired from the relational expression of the output values of the CCD sensor and the light energies containing the calculated noise-model data D4, and then the radiant illuminance is calculated from the acquired light energies.

Figure 5:
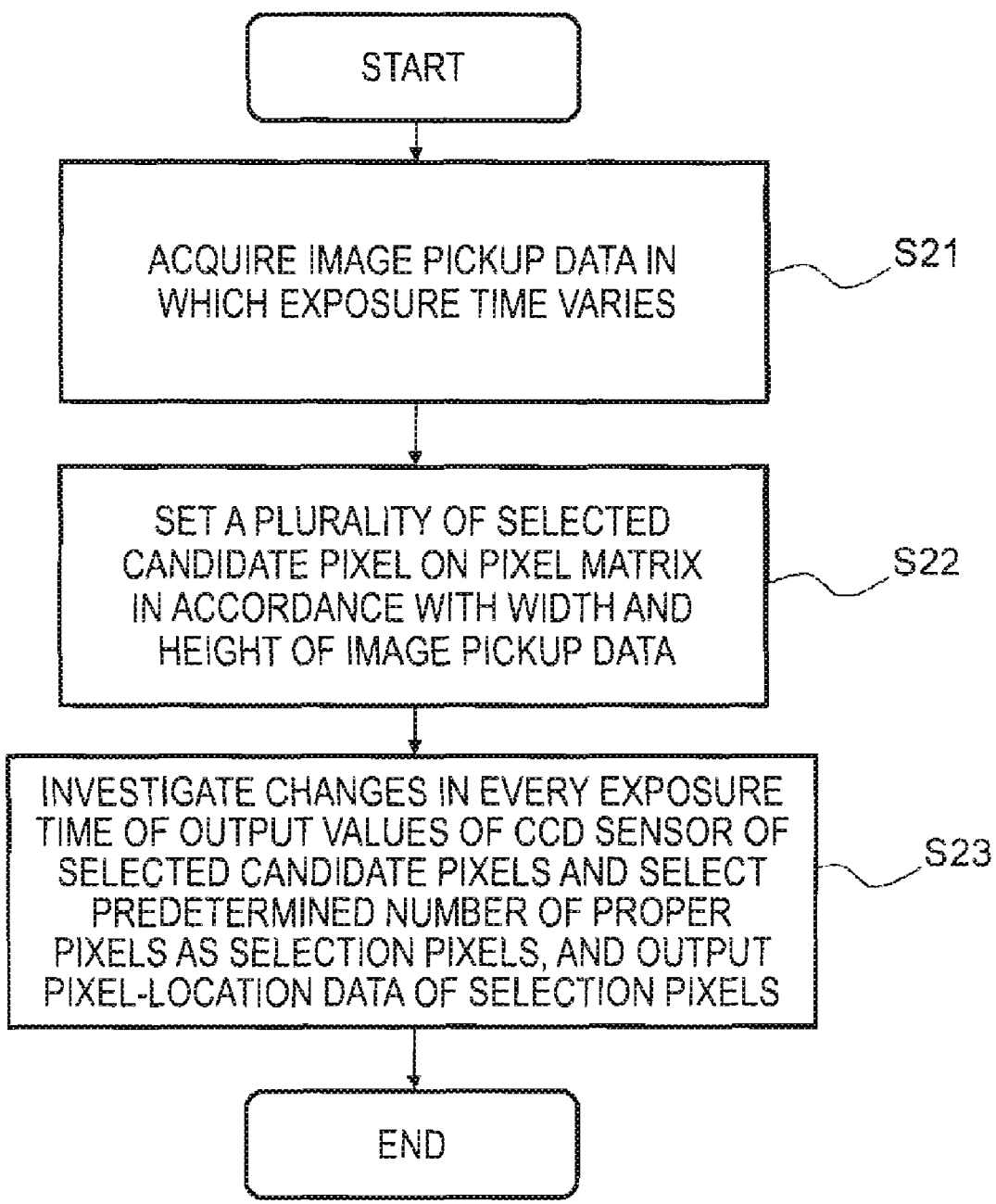
FIG. 5 is a flowchart explaining a processing sequence of outputting pixel-location data performed by pixel-location data output section 11.

FIG. 5 is a flowchart explaining a processing sequence of outputting pixel-location data performed by the pixel-location data output section 11. As shown in FIG. 5 a plurality of image pickup data $D_A, D_B, D_C, \ldots$ corresponding to each exposure time are received (step S21) and a candidate pixel (selected candidate pixel) to be selected in accordance with a width (horizontal)×a height (vertical) of the image pickup data are set on the pixel matrix of the image pickup data (step S22).

It is invested how the output values of the CCD sensor in a plurality of selected candidate pixels are changed at each exposure time, a predetermined number of pixels are selected among proper pixels when the noise-model data are calculated among the plurality of selected candidate pixels, and the pixel-location data of the selected pixels (referred to as the selection pixels) are outputted (step S23). It is preferable that the selection pixels are selected such that the selection pixels do not exist on one side of the pixel matrix of the image pickup data but are uniformly distributed.

Figure 6:
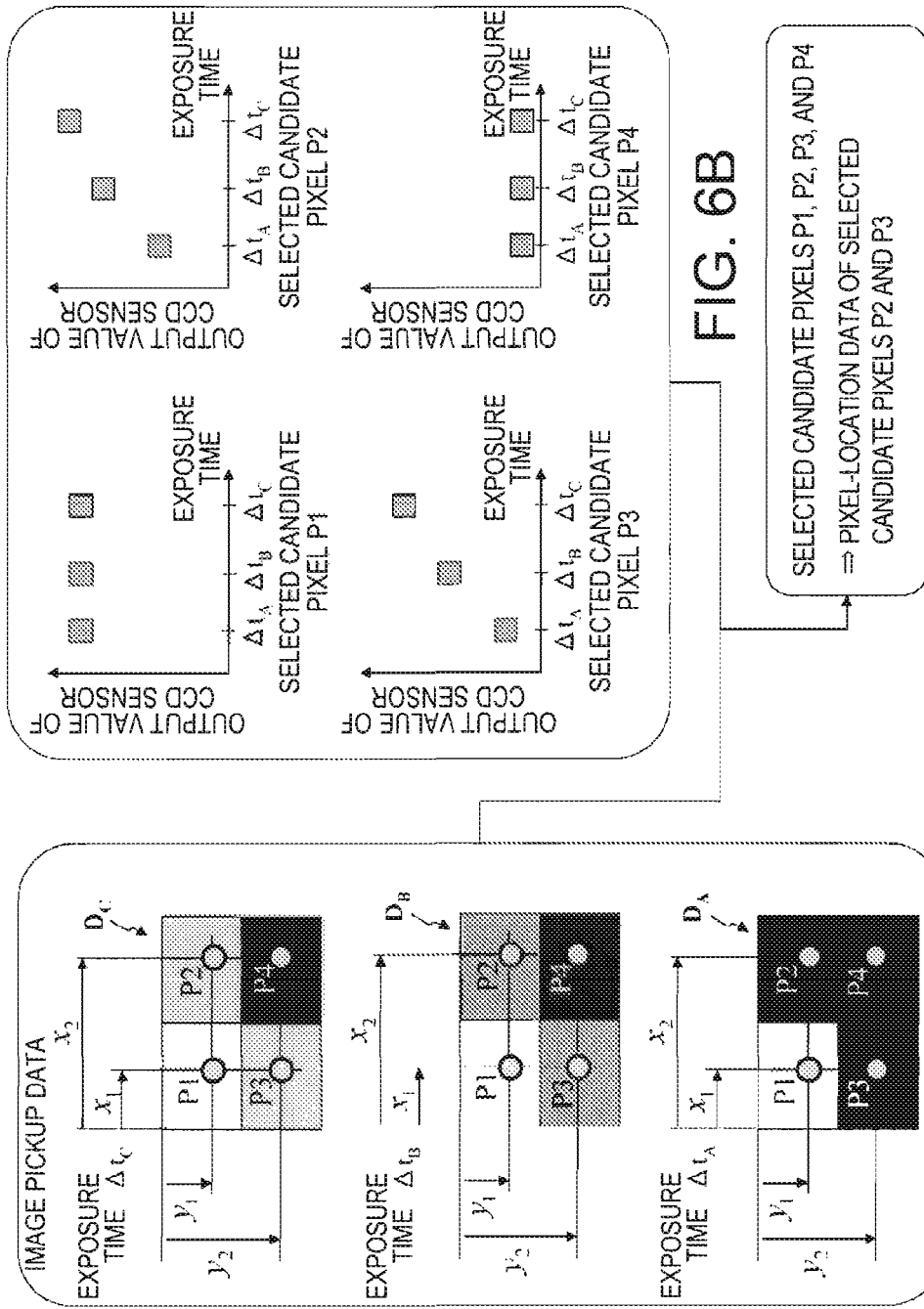
FIGS. 6A to 6C are diagrams illustrating a process of step S23 of FIG. 5 in detail.

FIGS. 6A to 6C are diagrams illustrating a process of step S23 of FIG. 5 in detail. FIG. 6A is image pickup data obtained by picking up an image every different exposure time. In order to give a brief explanation, exposure times $\Delta t$ are $\Delta t_A$, $\Delta t_B$, and $\Delta t_C$ ($\Delta t_A < \Delta t_B < \Delta t_C$) and the image pickup data obtained at the exposure times $\Delta t_A, \Delta t_B$, and $\Delta t_C$ are $D_A, D_B$, and $D_C$, respectively.

The selected candidate pixels are selected such that the selected candidate pixels do not exist on one side of the pixel matrix of the image pickup data, but are uniformly distributed. It is preferable that the number of the selected candidate pixels is 100 or more, but the proper number of the selected candidate pixels is selected in accordance with a size of the width×the height of the image pickup data.

In order to give a brief explanation, four pixels P1, P2, P3, and P4 are exemplified as the selected candidate pixel. When the pixel locations of the selected candidate pixels P1, P2, P3, and P4 each are marked in a coordinates, the pixel locations of the selected candidate pixels P1, P2, P3, and P4 are represented as $(x_1, Y_1)$, $(x_2, Y_1)$, $(x_1, Y_2)$, and $(x_2, Y_2)$, respectively.

FIG. 6B is the diagram illustrating a relation between the output values of CCD sensor with respect of the exposure time $\Delta t_A$, $\Delta t_B$, and $\Delta t_C$ of each selected candidate pixel P1, P2, P3, and P4. As shown in FIG. 6B, in the selected candidate pixel P1, values of the output values of the CCD sensor are high (exposure-excess state, that is, saturation state) every exposure time $\Delta t_A$, $\Delta t_B$, and $\Delta t_C$ and in the selected candidate P4, values of the output values of the CCD sensor are low (exposure-shortage state) every exposure time $\Delta t_A$, $\Delta t_B$, and $\Delta t_C$.

On the other hand, when the exposure time of the selected candidate pixels P2, P3 changes, the output values of the CCD sensor change in accordance with the exposure time. Accordingly, in the example shown in FIGS. 6A to 6C, when the noise-model data are calculated in FIG. 6C, the selected candidate pixels P2 and P3) are selected as proper pixels among the selected candidate pixels P1, P2, P3, and P4, and then the pixel locations thereof are outputted as pixel-location data D2.

According to the embodiment of the invention, as the output values of the CCD sensor used at the time of calculating the noise-model data, the output values of the CCD sensor of the pixels in which the output values of the CCD sensor are properly changed every exposure time are used among the pixels designated as the pixel-location data D2 outputted from the pixel-location data output section 11, that is, the selected candidate pixels set on the pixel matrix of the image pickup data.

Figure 7:
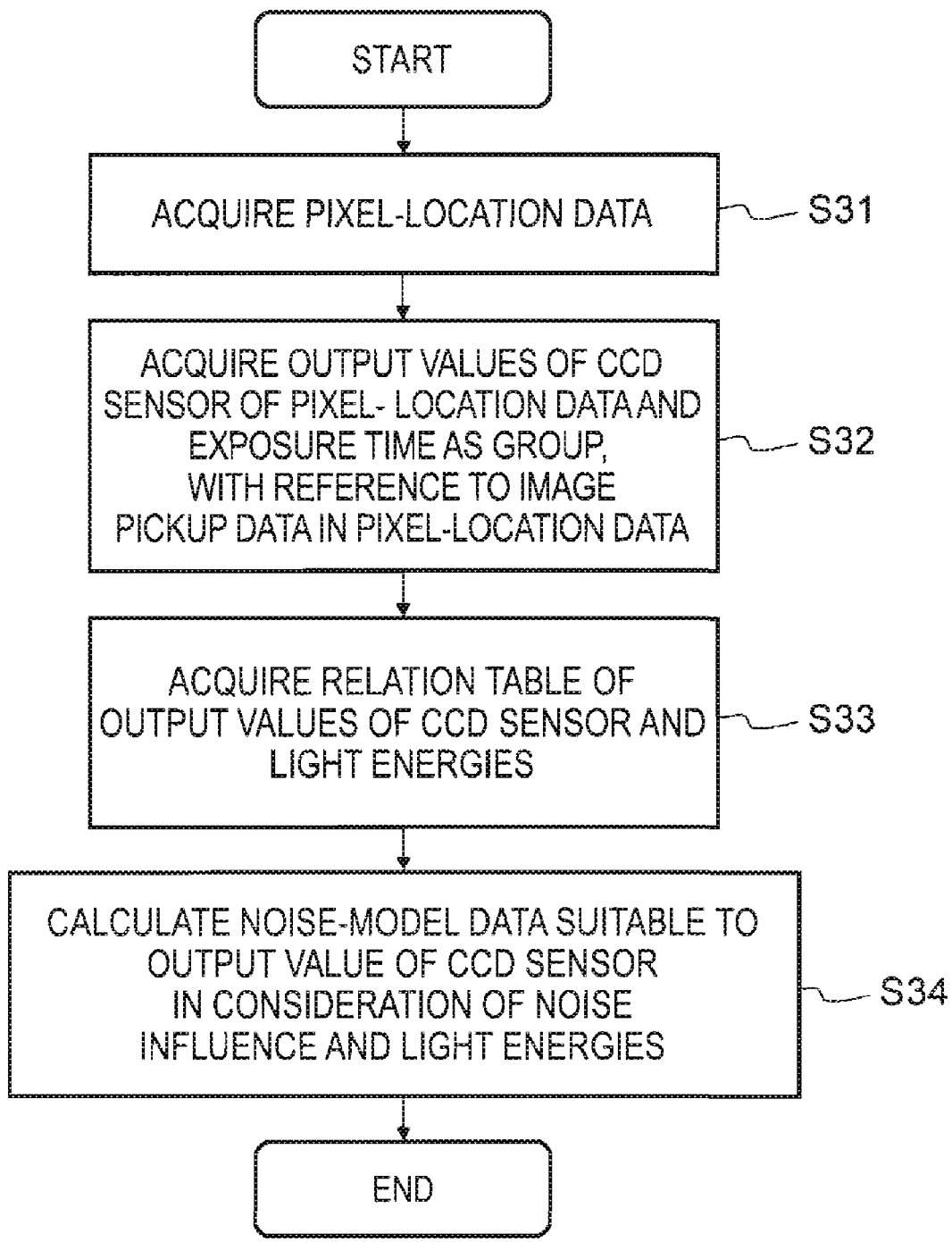
FIG. 7 is a flowchart explaining a processing sequence of calculating noise-model data which noise-model data calculating section 12 performs.

FIG. 7 is a flowchart explaining a processing sequence of calculating the noise-model data which the noise-model data calculating section 12 performs. First, as shown in FIG. 7, the pixel-location data D2 are acquired from the pixel-location data output section 11 (step S31). The image pickup data are referred to as the pixel-location data and the output values of the CCD sensor of the pixel-location data and the exposure time are acquired as a group (step S32). Sequentially, the relation table D3 of the output values of the CCD sensor and light energies are acquired (step S33).

Noise-model data suitable to the relational expression of the output values of the CCD sensor arid the light energies in consideration of the influence of the noise are calculated on the basis of the acquired each data in steps S31 to S33 (step S34).

Next, a calculation of the noise-model data will be described. The influence of the noise (increment of the output values of the CCD sensor due to the noise) has the exposure time as a parameter as described above. In this case, when the influence of the noise is a linear function of the exposure time, the influence of the noise $\delta$ is expressed as follows:

$$\delta = \alpha \cdot \Delta t \qquad (10).$$

Additionally, when noise influence is not a non-linear function of the exposure time, the influence of the noise $\delta$ can be expressed as an example as follows:

$$\delta = \alpha \cdot \Delta t + \beta \cdot (\Delta t)^2 \qquad (11)$$

where $\alpha$ and $\beta$ are a constant.

Like Expressions 10 and 11, when the influence of the noise $\delta$ is the linear function or the non-linear function of the exposure time, the noise-model data can be generated by evaluating the constant $\alpha$ of Expression 10 or evaluating the constant $\alpha$ and $\beta$.

Now, it will be described when the influence of the noise is the non-function of the exposure time, that is, when $\alpha$ and $\beta$ are evaluated by using Expression 8 described above.

First, Expression 8 is modified as follows:

$$\delta \frac{\partial g}{\partial Z} = g(Z) - E \cdot \Delta t, \qquad (12)$$

and then Expression 11 are substituted for $\delta$ of Expression 12 to obtain Expression 13 as follows:

$$\alpha \cdot \Delta t_j + \beta \cdot (\Delta t_j)^2 = \frac{g(Z_{i,j}) - E_i \cdot \Delta t_j}{\partial g / \partial Z|_{i,j}}, \qquad (13)$$

where i is an index of a pixel and j is an index of the exposure time.

Figure 8:
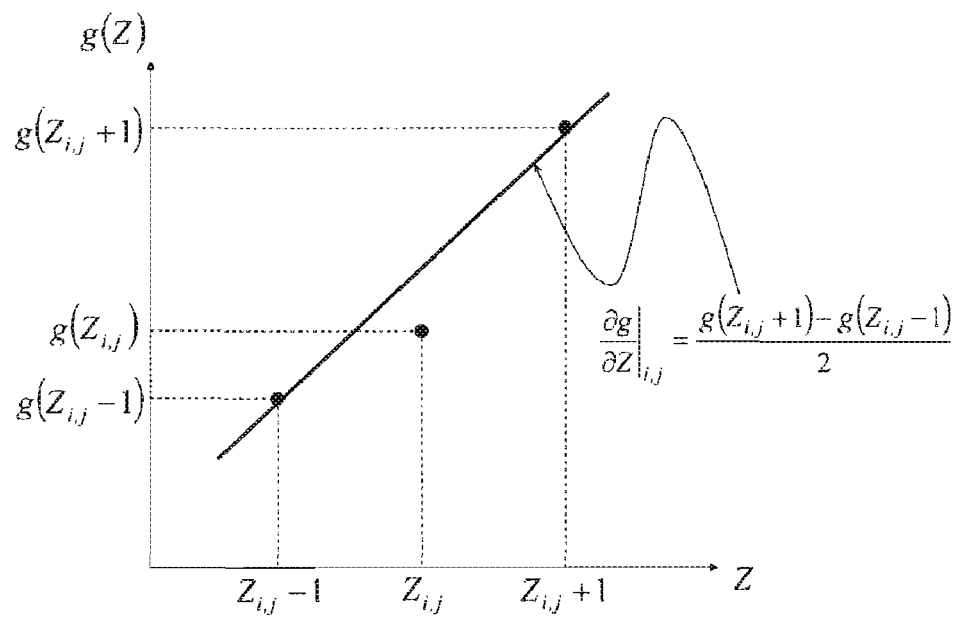
FIG. 8 is a diagram explaining an example representing the denominator (differential expression) of the right term of Expression 13 as difference expression.

In order to more easily calculate Expression 13, by representing the denominator of the right term of Expression 13 (differential expression) as difference expression (see FIG. 8) as follows:

$$\frac{\partial g}{\partial Z}\bigg|_{i,j} = \frac{g(Z_{i,j} + 1) - g(Z_{i,j} - 1)}{2}. \qquad (14)$$

In Expression 13, the output values of the CCD sensor every exposure time of each pixel-location data are used to introduce weighted least squares approximation, and then given simultaneous equations are calculated to evaluate $\alpha$ and $\beta$.

That is, first, Expression 13 is expressed as follows:

$$\alpha \Delta t_j + \beta (\Delta t_j)^2 = \phi_{i,j} \qquad (15),$$

where $\phi_{i,j}$ is expressed as follows:

$$\phi_{i,j} = \frac{g(Z_{i,j}) - E_i \cdot \Delta t_j}{\partial g / \partial Z|_{i,j}}. \qquad (16)$$

In the pixel-location data of each selected pixel, $\alpha$ and $\beta$ are evaluated by solving the output values $Z_{i,j}$ of the CCD sensor at the exposure time $\Delta t_j$ and the simultaneous equations given from the exposure time $\Delta t_j$ which are expressed as follows:

$$\begin{bmatrix} \sum_{j=1}^{N}\sum_{i=1}^{P} W(Z_{i,j})(\Delta t_j)^2 & \sum_{j=1}^{N}\sum_{i=1}^{P} W(Z_{i,j})(\Delta t_j)^3 \\ \sum_{j=1}^{N}\sum_{i=1}^{P} W(Z_{i,j})(\Delta t_j)^3 & \sum_{j=1}^{N}\sum_{i=1}^{P} W(Z_{i,j})(\Delta t_j)^4 \end{bmatrix} \begin{Bmatrix} \alpha \\ \beta \end{Bmatrix} = \qquad (17)$$

$$\begin{Bmatrix} \sum_{j=1}^{N}\sum_{i=1}^{P} W(Z_{i,j})\Delta t_j \phi_{i,j} \\ \sum_{j=1}^{N}\sum_{i=1}^{P} W(Z_{i,j})(\Delta t_j)^2 \phi_{i,j} \end{Bmatrix}$$

where i is an index of the pixel position, j is an index of the exposure time, P is a total number of indexes of the pixels represented by the pixel position data and N is a total number of indexes of the exposure time.

In Expression 17, $W(Z_{i,j})$ is a weighting factor, which is expressed as follows:

$$W(Z_{i,j}) = \begin{cases} 2\dfrac{Z_{i,j} - Z_{Min}}{Z_{Max} - Z_{Min}} & \left(Z_{Min} \le Z < \dfrac{Z_{Max} - Z_{Min}}{2}\right) \\ 2\dfrac{Z_{i,j} - Z_{Max}}{Z_{Min} - Z_{Max}} & \left(\dfrac{Z_{Max} - Z_{Min}}{2} \le Z < Z_{Max}\right) \end{cases} \quad (18)$$

Figure 9:
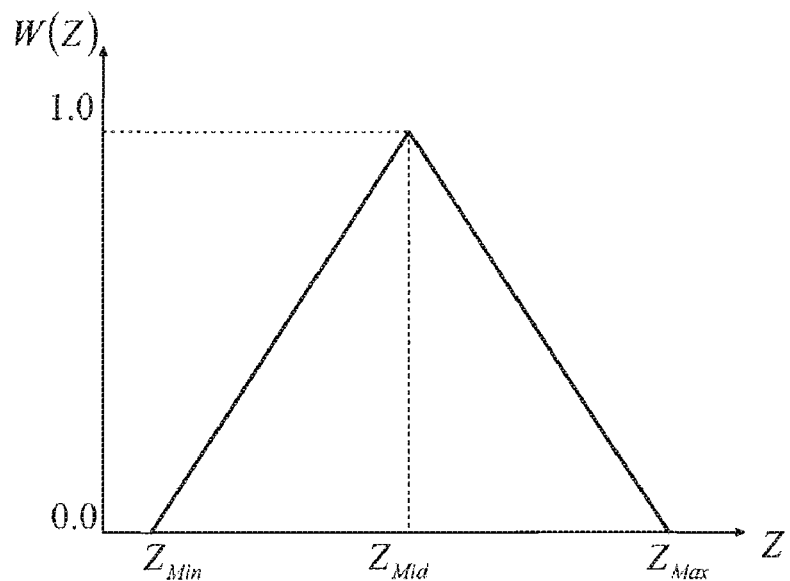
FIG. 9 is a diagram explaining a weighting factor W ($Z_{i,j}$).

FIG. 9 is a diagram explaining the weighting factor W ($Z_{i,j}$) As snows in FIG. 9, each weighting factor W (Z) of a minimum value $Z_{Min}$ and a maximum value $Z_{Max}$ of the output values of the CCD sensor is set so as to be 0.0 and the weighting factor W (Z) of a mid value $Z_{Mid}$ of the output values of the CCD sensor is set to be 1.0. Since the exposure-excess area (saturation area, the vicinity of $Z_{Max}$) and the exposure-shortage area (noise area, the vicinity of $Z_{Min}$) are areas in which the output values of the CCD sensor are not stable due to a characteristic of the CCD sensor, it is preferable that the weighting factor with respect to the areas is made as small as possible in order to lower an area influence. Additionally, the mid value $Z_{Mid}$ of the output values of the CCD sensor is evaluated by calculating Expression 19 expressed as follows:

$$Z_{Min} = (Z_{max} + Z_{Min})/2 \quad (19).$$

Figure 10:
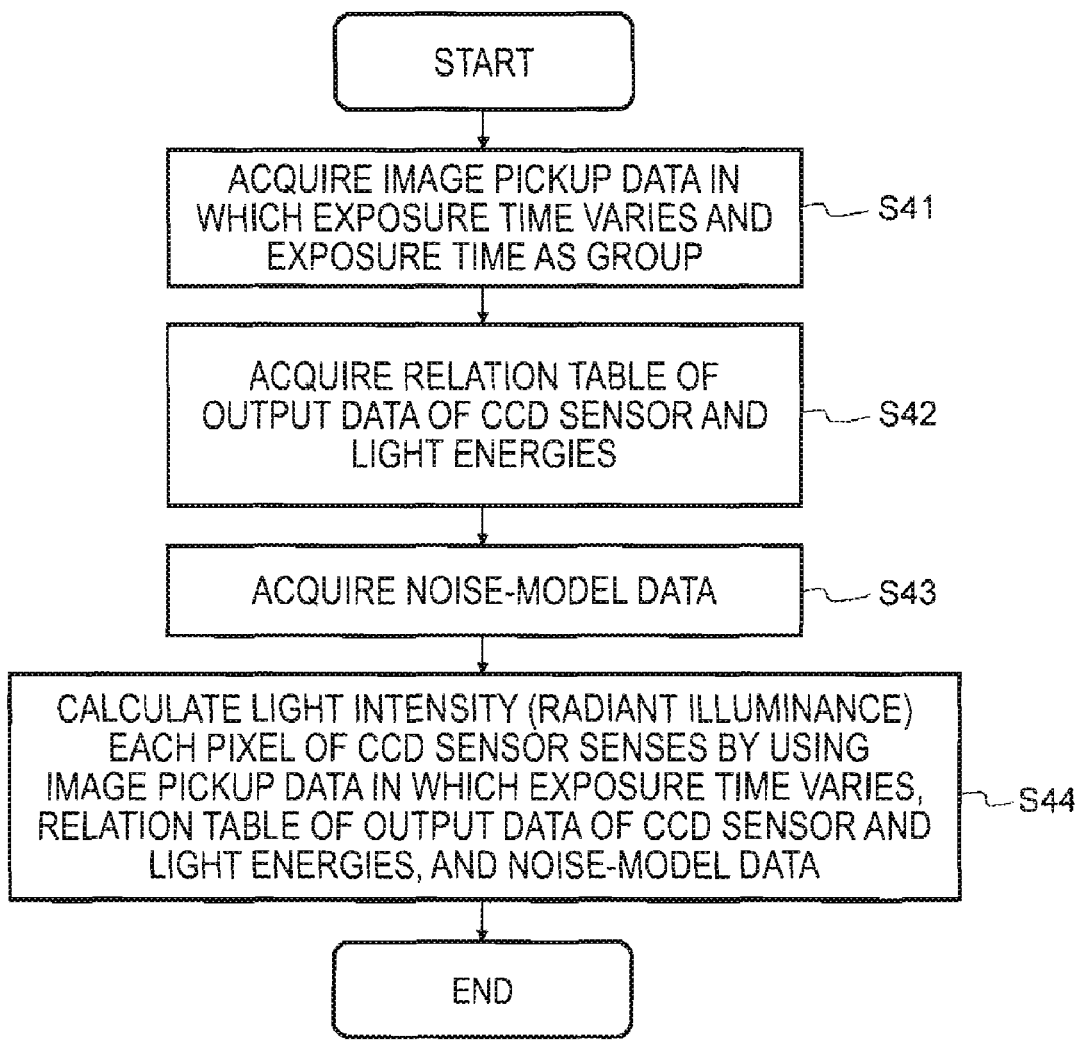
FIG. 10 is a flowchart explaining a calculation-processing sequence of a radiant illuminance which a radiant illuminance calculating section 13 performs.

FIG. 10 is a flowchart explaining a calculation processing sequence of a radiant illuminance which a radiant illuminance calculating section 13 performs. As shown in FIG. 10, the image pickup data in which the exposure time varies and the exposure time are acquired as a group (step S41). The relation table D3 of the output values of the CCD sensor and the light energies are acquired (step S42). Additionally, the noise-model data D4 calculated in the noise-model data calculating section 12 are acquired (step S43).

By using each data acquired in steps S41 to S43, that is, the image pickup data in which the exposure time varies, the exposure time, the relation table D3 of the output values of the CCD sensor and the light energies, and the noise-model data D4, the intensity of light (radiant illuminance) sensed by each pixel of the CCD sensor are calculated (step S44).

In step S44, particularly, a relational expression of the output values of the CCD sensor containing the noise-model data and the light energies is generated on the basis of the noise-model data D4, the image pickup data $D_A$, $D_B$, $D_C$, ... , and the relation table D3 of the output values of the COD sensor and the light energies. Sequentially, by using the relational expression of the output values of the COD sensor containing the noise-model data and the light energies, the light energies are acquired, and then the radiant illuminance is calculated from the acquired light energies.

A radiant illuminance $E_i$ of any pixel i of the CCD sensor is the same as that of Expression 5 and an expression having a weighted average in consideration of a weight with respect of the output values of the CCD sensor is expressed as follows:

$$E_i = \dfrac{\sum_{j=1}^{N}\left\{W(Z_{i,j})\dfrac{g(Z_{i,j}) - (\partial g/\partial Z|_{i,j})[\alpha\Delta t_j + \beta(\Delta t_j)^2]}{\Delta t_j}\right\}}{\sum_{j=1}^{N} W(Z_{i,j})} \quad (20)$$

where i is an index of a pixel and j is an index of the exposure time Δt. The differential equation contained in the numerator of the right term of Expression 20 can be expressed as the difference expression of Expression 14. Additionally, the weighting factor W ($Z_{i,j}$) is expressed as Expression 18.

When the pixel i at the exposure time $\Delta t_j$ without consideration of the noise and the radiant illuminance $E_i$ at the exposure time $\Delta t_j$ are expressed as an expression having the weighted average in consideration of the weighting factor W ($Z_{i,j}$) in Expression 2 described above, it is expressed as follows:

$$E_i = \dfrac{\sum_{j=1}^{N} W(Z_{i,j})\dfrac{g(Z_{i,j})}{\Delta t_j}}{\sum_{j=1}^{N} W(Z_{i,j})}. \quad (21)$$

Comparing Expressions 20 and 21, the noise-model data (see Expression 11) is contained in Expression 20. The influence of the noise (increment of the output values of the CCD sensor due to the noise) δ of the image pickup data is considered in the radiant illuminance $E_i$ which is evaluated by Expression 20. Accordingly, by using Expression 20 to calculate the intensity of light (radiant illuminance) sensed by each pixel of the CCD sensor, the radiant illuminance in which the influence of the noise is removed can be obtained.

According to the embodiment of the invention, the influence of the noise (increment of the output values of the CCD sensor due to the noise) is calculated from the output values of the CCD sensor as the noise-model data on the basis of the image pickup data acquired at the different exposure time, and then the influence of the noise is suppressed on the basis of the noise-model data. Accordingly, the intensity of the sensed light of the output values of the CCD sensor, that is, the radiant illuminance with a higher precision can be acquired.

The invention is not limited to the described embodiment, but may be modified in various forms without departing from the gist of the invention.

As a program for executing the illuminance acquiring process described above according to the embodiment of the invention in a computer, an illuminance acquiring program can be recorded in various recording media as well. Accordingly, the invention contains the recording media recording the illuminance acquiring program and the illuminance acquiring program can be acquired from a network as well.

The entire disclosure of Japanese Patent Application No. 2006-42023, filed Feb. 20, 2006 is expressly incorporated by reference herein.

What is claimed is:

1. An illuminance acquiring device which acquires light energy corresponding to an output value of an image pickup device every different exposure time by using a correspondence relation between the output value of the image pickup device for converting intensity of sensed light into electric energy and outputting the electric energy and the light energy obtained by multiplying the intensity of light sensed by the image pickup device by the exposure time, calculates the intensity of the light sensed by the image pickup device from the light energy acquired every different exposure time and the correspondence relation, and acquires the calculated intensity of the light sensed by the image pickup device, the illuminance acquiring device comprising:

a noise-model data calculating section calculating noise-model data for modeling an influence of a noise generated in the image pickup device on the output value of the image pickup device by using image pickup data obtained by means of the image pickup operation of the image pickup device every different exposure time; and an illuminance calculating section calculating the output value of the image pickup device in consideration of the influence of the noise from the noise-model data and the output value of the image pickup device when the image pickup device picks up a predetermined image, acquiring the light energy from the correspondence relation by using the calculated output value of the image pickup device in consideration of the influence of the noise, and calculating the intensity of the light, which is sensed when the image pickup device picks up the predetermined image, from the acquired light energy and the exposure time when the image pickup device picks up the predetermined image.

2. The illuminance acquiring device according to claim 1, further comprising a pixel-location data output section which selects a plurality of pixels from the image pickup data to set the selected pixels as selection pixels and outputs pixel locations of the set selection pixels as pixel-location data.

3. The illuminance acquiring device according to claim 2, wherein a plurality of pixels are set as selection candidate pixels from the image pickup data and the selection pixels are set by selecting the pixels outputting a value in which the output value of the image pickup device varies every exposure time of the different exposure times.

4. The illuminance acquiring device according to claim 2, wherein the output value of the image pickup device in the pixel designated by the pixel-location data is used as the output value of the image pickup device used to calculate the noise-model data.

5. The illuminance acquiring device according to claim 1, wherein the noise-model data calculating section and the illuminance calculating section perform a weighting process of reducing an influence of an exposure-excess area and an exposure-shortage area on the output value of the image pickup device when calculating the noise-model data and the intensity of the light sensed by the image pickup device.

6. The illuminance acquiring device according to claim 1, wherein the noise-model data have the exposure time as a parameter.

7. The illuminance acquiring device according to claim 1, wherein the image pickup device is a CCD sensor.

8. An illuminance acquiring method of acquiring light energy corresponding to an output value of an image pickup device every different exposure time by using a correspondence relation between the output value of the image pickup device for converting intensity of sensed light into electric energy and outputting the electric energy and the light energy obtained by multiplying the intensity of light sensed by the image pickup device with the exposure time, calculating the intensity of the light sensed by the image pickup device from the light energy acquired every different exposure time and the correspondence relation, and acquiring the calculated intensity of the light sensed by the image pickup device, the illuminance acquiring method comprising:
calculating noise-model data for modeling an influence of a noise generated in the image pickup device on the output value of the image pickup device by using image pickup data obtained by means of the image pickup of the image pickup device at different exposure time; and
calculating the output value of the image pickup device in consideration of the influence of the noise from the noise-model data and the output value of the image pickup device when the image pickup device picks up a predetermined image, acquiring the light energy from the correspondence relation by using the calculated output value of the image pickup device in consideration of the influence of the noise, and calculating the intensity of the sensed light when the image pickup device picks up the predetermined image from the acquired light energy and the exposure time when the image pickup device picks up the predetermined image.

9. A non-transitory computer-readable medium configured to store an illuminance acquiring program of acquiring light energy corresponding to an output value of an image pickup device every different exposure time by using a correspondence relation between the output value of the image pickup device for converting intensity of sensed light into electric energy and outputting the electric energy and the light energy obtained by multiplying the intensity of light sensed by the image pickup device with the exposure time, calculates the intensity of light sensed by the image pickup device from the light energy acquired every different exposure time and the correspondence relation, and acquiring the calculated intensity of light sensed by the image pickup device, the illuminance acquiring program comprising:
calculating noise-model data for modeling an influence of a noise generated in the image pickup device on the output value of the image pickup device by using image pickup data obtained by means of the image pickup of the image pickup device at different exposure time; and
calculating the output value of the image pickup device in consideration of the influence of the noise from the noise-model data and the output value of the image pickup device when the image pickup device picks up a predetermined image, acquiring the light energy from the correspondence relation by using the calculated output value of the image pickup device in consideration of the influence of the noise, and calculating the intensity of the sensed light when the image pickup device picks up the predetermined image from the acquired light energy and the exposure time when the image pickup device picks up the predetermined image.

* * * * *